United States Patent
Larsen et al.

(10) Patent No.: US 9,000,715 B2
(45) Date of Patent: Apr. 7, 2015

(54) COMBINED PRIMARY AND SECONDARY UNITS

(71) Applicant: Nilfisk-Advance A/S, DK-2605 Brøndby (DK)

(72) Inventors: Peter Nøhr Larsen, Copenhagen (DK); Michael Gamtofte, Randers NØ (DK); Anton Sørensen, Hadsund (DK)

(73) Assignee: Nilfisk-Advance A/S, Brøndby (DK)

( * ) Notice: Subject to any disclaimer, the term of this patent is extended or adjusted under 35 U.S.C. 154(b) by 371 days.

(21) Appl. No.: 13/683,675

(22) Filed: Nov. 21, 2012

(65) Prior Publication Data

US 2013/0127397 A1     May 23, 2013

(30) Foreign Application Priority Data

Nov. 22, 2011    (EP) .................................. 11388005

(51) Int. Cl.
*H02J 7/00* (2006.01)
*A47L 5/22* (2006.01)
*A47L 9/28* (2006.01)
*A47L 11/40* (2006.01)

(52) U.S. Cl.
CPC . *H02J 7/00* (2013.01); *A47L 5/225* (2013.01); *A47L 9/2873* (2013.01); *A47L 11/40* (2013.01); *A47L 11/4005* (2013.01)

(58) Field of Classification Search
CPC ...... Y02E 60/12; H02J 7/0054; H02J 7/1423; H01M 10/44; H01M 10/46
USPC ........................................................ 320/103
See application file for complete search history.

(56) References Cited

U.S. PATENT DOCUMENTS

| | | | |
|---|---|---|---|
| 2004/0025268 A1* | 2/2004 | Porat et al. | ........................ 15/1.7 |
| 2004/0134022 A1 | 7/2004 | Murphy et al. | |
| 2006/0059892 A1* | 3/2006 | Hu et al. | .......................... 60/274 |
| 2007/0157416 A1 | 7/2007 | Lee et al. | |
| 2007/0157420 A1 | 7/2007 | Lee et al. | |
| 2008/0105278 A1 | 5/2008 | Kang et al. | |
| 2009/0296442 A1* | 12/2009 | Chang et al. | ................... 363/142 |
| 2009/0307865 A1 | 12/2009 | Williamson et al. | |

FOREIGN PATENT DOCUMENTS

| | | |
|---|---|---|
| EP | 1806085 A2 | 7/2007 |
| JP | 10 014825 A | 1/1998 |
| JP | 2003 180587 A | 7/2003 |

OTHER PUBLICATIONS

European Search Report for EP 11 38 8005, dated Jun. 26, 2012, 2 pages.

* cited by examiner

*Primary Examiner* — Arun Williams
(74) *Attorney, Agent, or Firm* — William J. Sapone; Ware Fressola Maguire & Barber LLP

(57) ABSTRACT

A system has a primary unit (1) and a number of secondary units (16), which may be stored in receiving slots in the primary cleaning unit (1) or be coupled to the primary unit. The primary and secondary units are configured as movable cleaning or grounds maintenance units capable of performing at least one cleaning or grounds maintenance operation. The primary unit (1) is powered by a power source (2), which also powers the secondary unit (16) or charges a power source (17) in the secondary unit (16). Each unit has a communications module (13, 25) capable of communicating with each other and/or a remote location. At least one of the units (1, 16) may include one or more proximity or near-field sensors and/or one or more sensor for sensing the performance of the unit (1, 16).

16 Claims, 2 Drawing Sheets

COMBINED PRIMARY AND SECONDARY UNITS

TECHNICAL FIELD

The present invention relates to a system for performing at least one cleaning or grounds maintenance operation comprising a primary unit and one or more secondary units, where the primary unit comprises a power source, an optional charger module for charging the secondary units and receiving means for storing the secondary units or means for coupling the secondary units to the primary unit, and where the secondary unit comprises a power source, elements for performing at least one cleaning or grounds maintenance operation and a controller controlling the operation of the secondary unit.

BACKGROUND

Various systems comprising a primary unit and a secondary unit are described throughout the literature. An example of such a combined cleaning unit is described in US 2009/0307865 A1, which discloses a charging cart having multiple receiving means for holding and charging multiple portable vacuum cleaners, which are driven by an internal battery. The cart is not able to perform any cleaning functions, but only functions as a docking station for the portable units. This increases the labour time, since all the cleaning functions have to be carried out by the portable units.

US 2007/0157415 A1 discloses a docking station, which may be used as a manual vacuum cleaner if the hose is connected to the station, and a second cleaner configured as a robot cleaner. This cleaning system has the disadvantage that the docking station is powered by an external power supply via a power cable, which limits the operational range of the station, while the robot cleaner has a single built-in battery, which limits its operation time. US 2007/0157420 A1 discloses a similar solution having a docking station for a robot cleaner, which may be used as a manual vacuum cleaner when the robot cleaner is connected to the docking station. This system has the disadvantage that the main body of the vacuum cleaner cannot be used when the two components are detached, since the dust collecting arrangement is only present in the robot cleaner.

US 2008/0105278 A1 discloses a manual vacuum cleaner having a detachable driving unit with batteries and a detachable dust compartment, which may be coupled together to form a handheld vacuum cleaner. This system has the disadvantage that the main body of the vacuum cleaner cannot be used when the two components are detached, since the vacuum cleaner has only one dust compartment. US 2004/0134025 A1 discloses a battery driven handheld vacuum cleaner, which may be connected to a stick-type cleaning pad in order to form a manual vacuum cleaner. This system has the disadvantage that the operation time of the vacuum cleaner is limited, if it only uses the battery, and the operational range is limited, if the vacuum cleaner uses a power cord to charge the batteries.

SUMMARY OF THE INVENTION

The present invention remedies the drawbacks of the most immediate prior art by providing a system characterized in that the primary unit comprises elements for performing at least one cleaning or grounds maintenance operation, and that the power source in the primary unit is a combustion engine, a fuel cell or batteries, which is capable of powering or charging the power source in the secondary unit when the secondary unit is connected to the primary unit. The units may be configured as movable cleaning units or movable grounds maintenance units, where the primary unit powers or charges one or more secondary units. The primary unit may be configured as movable grounds maintenance unit or a movable cleaning unit, the secondary unit may be configured as a portable unit, i.e. a portable grounds maintenance unit or a portable cleaning unit, and where the primary unit powers or charges one or more secondary units. This increases the range and operating time of the primary unit and secondary units, since the primary unit only has to be connected to an external power source when the power source needs to be recharged, refuelled or serviced.

The power source in the secondary unit may be a power circuit connected to the power source in the primary unit by a power cable or by wireless power interfaces, which power electrical components in the secondary unit. By not having an internal power source, the size of the secondary unit may be reduced.

In one embodiment, the primary unit comprises receiving means for storing the secondary units and a charging module, which is connected to the power source in the secondary unit when the secondary unit is stored in the primary unit. This enables the primary unit to charge the secondary unit at all times, which in turns increases the operating time of the secondary unit, saves space, and enables the secondary units to be protected against external impacts when not used.

In another embodiment, the primary unit comprises a charging module and a first coupling part capable of engaging a second coupling part located on the secondary unit, where the charging module is connected to the power source in the secondary unit when the secondary unit is coupled to the primary unit. The secondary unit furthermore comprises a first coupling part, where the two coupling parts are located at opposite ends of the secondary unit. This enables the primary unit to charge the secondary unit at all times, which in turns increases the operating time of the secondary unit and enables the secondary units to be coupled to each other, i.e. in a row, or to the primary unit for storing or charging.

According to another embodiment, the charging module may be connected to the power source by a power cable or a plug-socket arrangement or via power terminals or wireless power interfaces, which are located in the primary unit and the secondary unit, respectively. This enables the secondary units to be charged when stored in the receiving means or when located near the primary unit.

According to yet another embodiment, both units may comprise second receiving means or a battery compartment having one or more slots for holding one or more exchangeable batteries or battery packs, where the receiving means in the primary unit is connected to the charging module and the receiving means in the secondary unit is connected to the controller. This enables the units to hold more than one battery of different technologies, ages, capacities or the like, and to selectively charge or discharge the batteries. This in turns increases the range and operating time of the secondary units.

In another embodiment, both units may have a third coupling arrangement, which couples storage means, which hold collected particles, debris or fluids in the secondary unit, to storage means, which hold collected particles, debris or fluids in the primary unit, when the secondary unit is stored in the primary unit. This enables the primary unit to transfer the contents of the storage means in the secondary unit to its own storage means.

Both units comprise a communications module, which is able to communicate with each other and/or an external device or system. This enables at least one of the units to be controlled from a remote location or the secondary units to be controlled from the primary unit or the remote location.

According to one embodiment, at least one of the units comprises one or more proximity or near-field sensors and/or one or more sensors sensing the performance of the unit, which are connected to the controller in the secondary unit or to control means in the primary unit. This enables the unit to steer around obstacles detected by the sensors and/or to sense the performance of the unit.

The primary unit comprises control means controlling the operation of the primary unit. This enables at least one of the units to be controlled like an autonomous robot.

In one embodiment, the primary unit may comprise at least one transmitter communicating with a receiver in the secondary unit by sound, light, laser, electromagnetic waves or other kinds of wireless communications means, where the controller uses the transmitted signal to guide the secondary unit into the receiving means in the primary unit or to guide the second coupling part into the first coupling part. This enables the secondary units to be deployed automatically and to guide themselves into the receiving means or coupling means.

BRIEF DESCRIPTION OF THE DRAWINGS

The embodiments of the invention will now be described with reference to the drawings, in which.

DETAILED DESCRIPTION OF THE INVENTION

Figure 1:
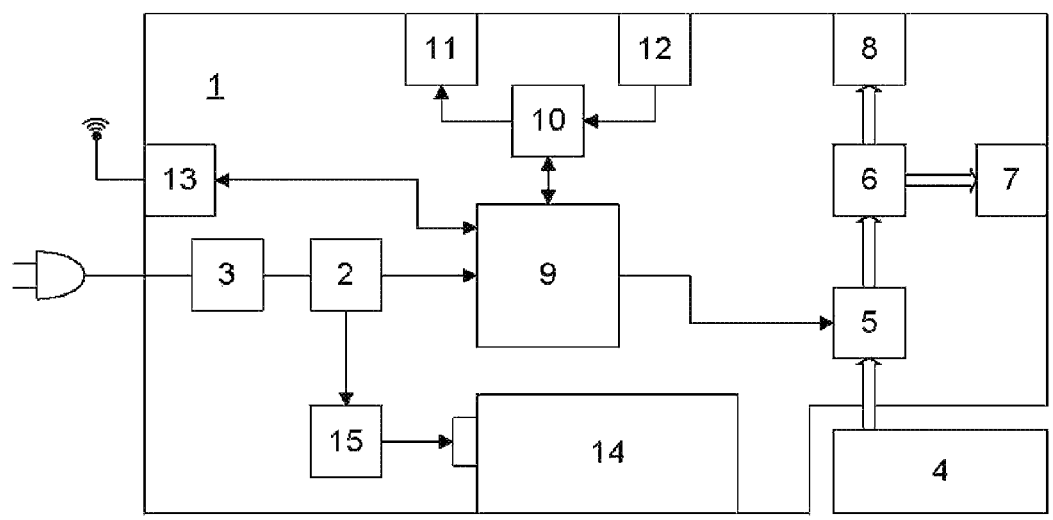
FIG. 1 shows a first exemplary embodiment of the primary unit.

FIG. 1 shows an exemplary embodiment of the system comprising a primary unit 1. The primary unit 1 comprises a power source 2, which powers the electrical components placed inside the housing of the unit 1. The power source 2 may be an internal combustion engine, one or more batteries, one or more fuel cells or other types of power sources. The batteries may be arranged in one or more battery packs, which may be charged by an internal or external charger. If the primary unit 1 is powered by batteries, the power source 2 may comprise a charging module 3 connected to an external power source by a wired connection or a wireless connection, which is then used to recharge the batteries. The batteries may be arranged as internal batteries or exchangeable batteries located in a battery compartment. This increases the range and operating time for the two units, since the primary unit only has to be connected to an external power source when the power source needs to be recharged, serviced or refuelled.

In one embodiment, the primary unit 1 may be configured as a movable cleaning unit, such as a scrubber dryer, a sweeper, a vacuum cleaner, a carpet cleaner or another cleaning unit comprising at least one set of wheels and means for cleaning floors, carpets or other types of surfaces. The primary unit 1 may comprise at least one drive wheel (not shown), which may be connected to the power source 2 so that the primary unit 1 may be moved. The primary unit 1 may comprise steering means (not shown) for controlling the movement of the unit and optionally a seating arrangement for the operator. The primary unit 1 may comprise any number of elements needed to perform the desired cleaning function, such as inlet means 4 connected to a pipe system, a collecting arrangement 5 for collecting contaminated fluid, debris or unwanted particles, optionally filter means 6 for separating the unwanted particles or debris from the fluid or air, storing means 7 for storing the unwanted particles, debris or fluid, and outlet means 8 for conveying the cleaned fluid away or back into the pipe system. The elements may be configured to perform wet cleaning, dry cleaning or a combination thereof. The collecting arrangement 5 may be configured as a blower arrangement, a brush arrangement or a pump arrangement, which is powered by the power source 2 or driven by the power source 2, i.e. by the engine in the power source 2 or a separate motor connected to the power source 2.

In another embodiment the primary unit 1 may be configured as a movable grounds maintenance unit, such as a mini tractor (also called garden tractors), a ride-on lawn mover, an all-terrain vehicle, a road sweeper, a utility vehicle, a green-area maintenance machine, a multi-purpose maintenance machine or another grounds maintenance unit. The primary unit 1 comprises at least one set of drive wheels connected to the power source 2, a seating arrangement for the operator and steering means. The primary unit 1 may comprise a number of elements configured to perform one or more functions and/or comprise coupling means for attaching one or more attachments configured to perform one or more functions. The elements and/or attachments may be configured to perform various functions, such as sweeping, mowing, sucking/blowing, spraying, snow removal, transporting, shoveling or other desired functions. The engine in the power source or a separate motor connected to the power source 2 may be used to drive the elements and/or the attachments means via the coupling means.

Control means 9 for controlling the operation of the primary unit 1 may be arranged inside the housing of the primary unit 1 and may be connected to a user interface 10 located on the outer side of the housing. The control means 9 may control the function of the elements, i.e. the motor, and comprises a processor which may receive one or more signals from one or more sensors sensing the performance of the primary unit 1. The user interface 10 may comprise a display module 11, which displays various information to the operator, and a user input module 12, i.e. a keypad, buttons, knobs or the like, which controls the operation of the primary unit 1. Alternatively, the display module 11 may comprise a touch-sensitive screen, which may also be used to control the operation. This enables an operator to control the operation of the primary unit 1 via the steering means and the user interface 10 on the primary unit 1.

Alternatively, the primary unit 1 may comprise one or more contact, proximity or near-field sensors (not shown), which may be connected to the control means 9 and may be used to steer the unit 1 around obstacles detected by the sensors. In this embodiment, the steering means and the optional seating arrangement may be omitted, and the drive wheels may be connected to the control means 9 instead. The control means 9 may be connected to a communications module 13 for communicating with one or more secondary units 16 and/or an external device or system. The communications module 13 may comprise a wireless interface configured to transmit and receive data from a remote location, i.e. control signals, activation signals, operational performance, location data or the like. This enables the primary unit 1 to be configured as an autonomous robot, which may be activated or controlled by a remote computer or the user input module 12. The primary unit 1 may be configured to automatically perform a desired function upon activation without interaction from the operator, or the operator may select the desired function via the remote location or the user input module 12.

In one embodiment, the primary unit 1 comprises one or more receiving means 14 for storing one or more secondary units 16, when they are not used. The receiving means 14 may be shaped according to the size and dimensions of the secondary units 16. The receiving means 14 may be configured as one or more compartments, and a lid or cover may be connected to the compartments so that they form a closed area, which shields the secondary units 16 from external impacts. The receiving means 14 may comprise a charging module 15 for charging a power source 17 in the secondary unit 16. The charging module 15 may use a direct coupling or an inductive coupling to charge or power the power source 17. This enables the secondary units 16 to be stored in and charged by the primary unit 1. This in turns saves space and enables the operator to reach places which cannot be reached by the normally larger primary unit 1.

In another embodiment, the receiving means 14 are replaced with coupling means (not shown), which couple the two units 1, 16 together. The coupling means comprise two engaging coupling parts located on the primary unit 1 and the secondary units 16, respectively. The two coupling parts may also be located at opposite ends of the secondary unit 16. The coupling means may use a mechanical, magnetic or electromagnetic coupling to hold the two units 1, 16 together. This enables the secondary units 16 to be coupled to the primary unit 1 and/or to each other, i.e. in a row. The charging module 15 may be located in or near the coupling means so that the secondary units 16 may be charged when coupled to the primary unit 1. This enables the operator to move several units 1, 16 at the same time and reach places which cannot be reached by the primary unit 1.

Figure 2:
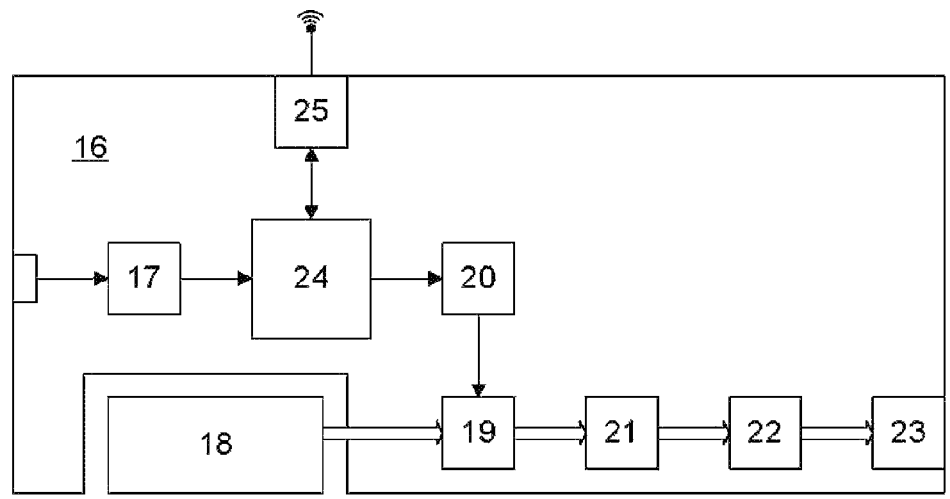
FIG. 2 shows a first exemplary embodiment of the secondary unit.

FIG. 2 shows an exemplary embodiment of the secondary unit 16, which may be stored in or coupled to the primary unit 1. The power source 17 in the secondary unit 16 powers the electrical components placed inside the housing of the secondary unit 16. The power source 17 may comprise one or more batteries arranged in one or more battery packs. The batteries may be configured as internal batteries or exchangeable batteries located in a battery compartment. When the secondary unit 16 is placed in the receiving means 14 or coupled to the primary unit 1, the power source 17 may be coupled to the charging module 15 via power terminals or a plug-socket arrangement, which are located in the receiving means 14 or in or near the coupling means on the primary unit 1 and on the outer side of the housing of the secondary unit 16, respectively. Alternatively, the power terminals may be replaced by wireless power interfaces, i.e. coils, which use an inductive coupling to connect the power source 17 to the charging module 15. When the secondary unit 16 is not placed in the receiving means 14 or coupled to the primary unit 1, the power source 17 may be charged via the wireless power interfaces or a power cable (not shown) connected to the primary unit 1. This enables the primary unit 1 to charge the secondary unit 16 at all times, which in turns increases the operating time of the secondary unit 16.

Alternatively, the power source 17 may be configured as a power circuit, which is powered by the power source 2 in the primary cleaning unit 1 via the power cable or the wireless power interfaces located in both units 1, 16. By not having an internal power source, the size of the secondary unit 16 may be reduced.

The power cable may be arranged on a feeding structure (not shown), which feeds out the cable when the secondary unit 16 moves away from the primary unit 1 and retracts the cable when the secondary unit 2 moves toward the primary unit 1. The feeding structure may be located in the secondary unit 16 or in the primary unit 1. This prevents the power cable from blocking the movement of the secondary unit 16.

In one embodiment, the secondary unit 16 may be configured as a small movable cleaning unit, such as a scrubber, a sweeper, a vacuum cleaner, a carpet cleaner or another cleaning unit, comprising at least one set of wheels and means for cleaning floors, carpets or other types of surfaces. The secondary unit 16 may comprise at least one drive wheel (not shown), which may be connected to the power source 17. The secondary unit 16 may be configured as the same type of machine as the primary unit 1 or as another type of the cleaning machine. The secondary unit 16 may comprise any number of elements for performing the desired cleaning function, such as one or more inlets 18, a collecting arrangement 19 connected to a motor 20 powered by the power source 17, optional filter means 21, storage means 22, and one or more outlets 23. The secondary cleaning unit 16 may optionally have a steering arrangement, which the operator may use to operate the secondary unit 16. The collecting arrangement 19 may be configured as a blower arrangement, a brush arrangement or a pump arrangement.

In another embodiment the secondary unit 16 may be configured as a small movable grounds maintenance unit, such as a lawn mover, a road sweeper, a green-area maintenance machine, a utility vehicle, a multi-purpose maintenance machine or another grounds maintenance unit. The secondary unit 16 may be configured as the same type of machine as the primary unit 1 or as another type of the grounds maintenance machine. The secondary unit 16 may comprise at least one set of drive wheels connected to the power source 17. The secondary unit 16 may comprise a number of elements configured to perform one or more functions and/or comprise coupling means for attaching one or more attachments configured to perform one or more functions. The elements and/or attachments may be configured to perform various functions, such as sweeping, mowing, sucking/blowing, cutting, spraying, snow removal, transporting, shoveling or other desired functions. In a preferred embodiment, the secondary unit 16 has a small and compact configuration, which enables it to reach areas which are inaccessible for the primary unit 1.

In a third embodiment, the secondary unit 16 may be configured as a small portable grounds maintenance unit, such as a chain saw, a hedge cutter, a bush cutter, a trimmer, a multi-purpose unit or another portable unit. The secondary unit 16 may be configured as a small portable cleaning unit, such as a vacuum cleaner, a blower, a blower vac or another portable unit. The secondary unit 16 may be configured to perform a single function or a number of functions using a number of attachments, which may be attached to a main housing comprising the control means and the power source 17.

A controller 24, i.e. a processor, is arranged inside the housing of the secondary unit 16 and controls the operation of the unit 16. The controller 24 controls the function of the elements, i.e. the motor 20, and comprises a processor, which may receive one or more signals from one or more sensors sensing the performance of the secondary unit 16. The controller 24 may be connected to a communications module 25 for communicating with the primary unit 1 and/or the remote location. The communications module 25 may comprise a wireless interface configured to transmit and receive data from the control means 9 in the primary unit 1 or the remote location, i.e. control signals, activation signals, operational performance, location data or the like. Alternatively, the controller 24 may communicate with the primary unit 1 via the power cable or communicate directly with the external device or system via the wireless interface.

The secondary unit 16 may comprise one or more contact, proximity or near-field sensors (not shown), which may be connected to the controller 24 and may be used to steer the unit 16 around obstacles detected by the sensors. Alternatively, the operation and movement of the secondary unit 16 may be controlled from the primary unit 1 or the remote location. This enables the secondary unit 16 to be configured as an autonomous robot, which may be activated from the primary unit 1 or a remote computer. The secondary unit 16 may be configured to automatically perform a desired function upon activation without interaction from the operator, or the operator may select the desired function from the remote location or the primary unit 1.

Figure 3:
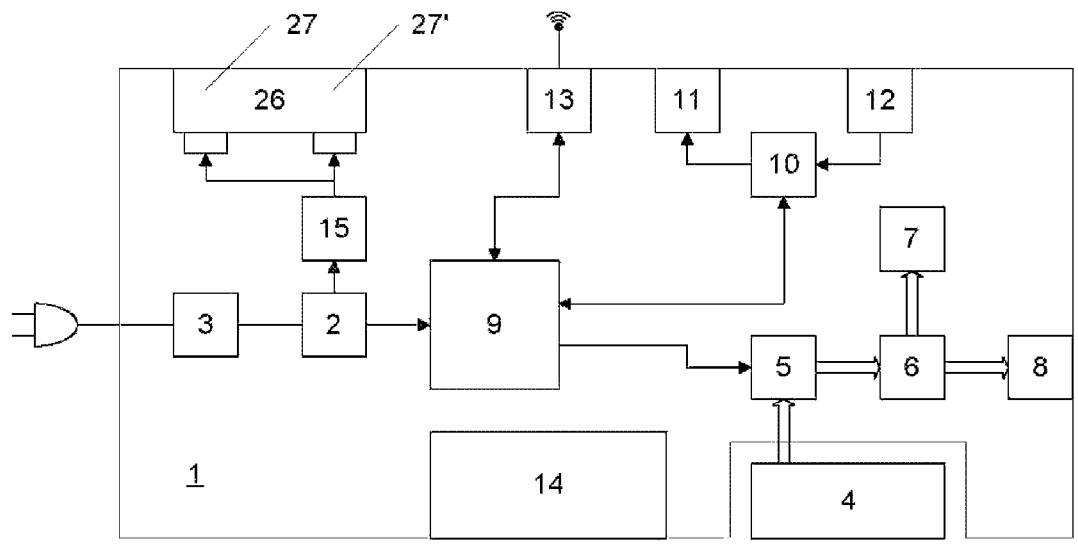
FIG. 3 shows a second exemplary embodiment of the primary unit.
Figure 4:
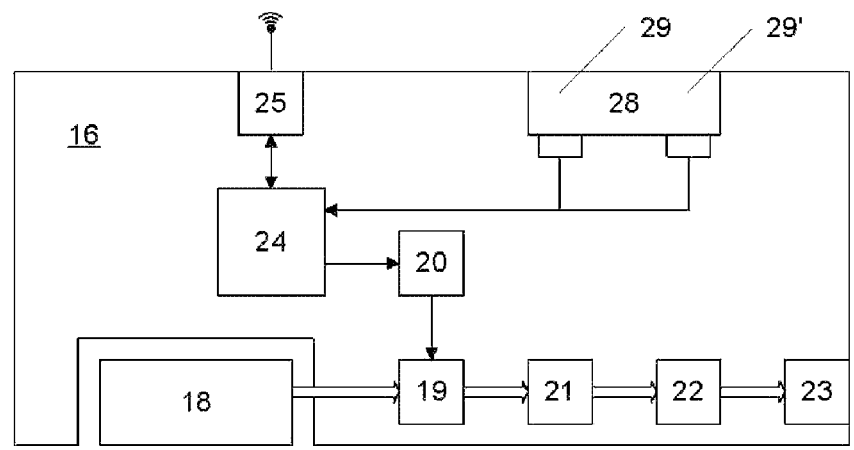
FIG. 4 shows a second exemplary embodiment of the secondary unit.

In one embodiment, the primary unit 1 may comprise a second receiving means 26 for charging one or more batteries and/or battery packs, which may be coupled to and drive the secondary unit 16, as shown in FIG. 3. The second receiving means 26 may have one or more slots 27, 27' for holding one or more batteries at the same time. The charging module 15 may be connected to the power terminals or the wireless power interface in each slot 27, 27' in the receiving means 26, and may selectively charge one or more batteries at the same time. Alternatively, a charging module (not shown) may be connected to each of the slots and may be controlled by the control means 9. The batteries may be of different technologies, ages, capacities or the like. The secondary units 16 comprise a second receiving means 28 having one or more slots 29, 29' for receiving one or more batteries or battery packs, which are used as the power source 17 to drive the electrical components, as shown in FIG. 4. The second receiving means may be configured as a battery compartment having a removable lid. The charging and discharging of the batteries in the units 1, 16 may be controlled by the control means 9 and the controller 24, respectively. This enables the units 1, 16 to hold more than one battery and to selectively charge or discharge the batteries. This in turn increases the range and operating time of the secondary units 16.

The primary unit 1 may have one or more extra batteries for the secondary units 16 so that the batteries in the secondary units 16 may be replaced or extra batteries may be added to the unit 16. This may be done manually by the operator or automatically by the primary unit 1. The primary unit 1 may comprise a movable arm (not shown) having one or more joints and a gripping arrangement located at the end of the arm, which is able to remove a selected battery from the secondary unit 16 and place it in an empty slot 27, 27' in the second receiving means 26, and vice versa. The arm may be moved automatically by the control means 9 in the primary unit 1.

The units 1, 16 may be operated independently of each other when at least one of the secondary units 16 is not stored in or coupled to the primary unit 1. The secondary units 16 may be automatically deployed by the primary unit 1 and/or deployed manually by the operator. The secondary units 16 may use its sensors to guide themselves into the receiving means 14 or the coupling means on the primary cleaning unit 1, or the operator may manually guide the secondary cleaning units 16 into the receiving means 14 or the coupling means. Alternatively, the secondary units 16 may use at least one transmitter, which is located in the receiving means 14 or the coupling means, and which communicates with a receiver in the secondary unit 16, to guide themselves into the receiving means 14 or the coupling means by using sound, light, laser, electromagnetic waves or other kinds of wireless communications means. This enables the units 1, 16 to reach more than one area at the same time, thus reducing the labour time needed to perform various functions. The labour time may be further reduced, if the secondary units 16 are able to guide themselves back into the receiving means 14 or into the coupling means.

When the secondary units 16 are placed in the receiving means 14 or in the coupling means they may be coupled automatically to the primary unit 1 via the terminals or the plug-socket arrangement located into the receiving means 14 or coupling means. The control means 9 may then communicate with the controller 24 to control the function of the secondary units 16.

A second coupling arrangement (not shown) may then be used to automatically couple the storage means 22 in the secondary cleaning unit 16 to the storage means 7 in the primary cleaning unit, so that the contents of the secondary storage means 22 may be transferred to the primary storage means 7. The second coupling arrangement may be located in the primary unit 1 and the secondary unit 16 respectively, and may be controlled by the control means 9. This enables the secondary units 16 to be emptied when coupled to the primary unit 1, thus increasing its operational range.

The invention claimed is:

1. A system for performing at least one cleaning or grounds maintenance operation, comprising:
    a primary unit having a power source and having elements configured for performing at least one cleaning or grounds maintenance operation;
    one or more secondary units, connectable to the primary unit, each secondary unit having a power source incorporated therewith, each secondary unit having elements configured for performing at least one cleaning or grounds maintenance operation, the secondary unit power source configured to receive power from or being charged by the primary unit power source;
    the primary unit power source being connectable to the one or more of the secondary unit power sources, for the delivery of power thereto or charging thereof, the primary unit having receiving means for storing one or more of the secondary units therein, the power sources of the secondary units being connectable to the primary unit power source when received therein;
    a primary controller for controlling the operation of the primary unit;
    one or more secondary controllers for controlling the operation of each secondary unit;
    wherein the primary unit power source is selected from the group consisting of a combustion engine, a fuel cell, and one or more batteries, which are capable of powering or charging the one or more secondary units connectable thereto; and,
    wherein the primary unit and the one or more secondary units each have a communications module which enable communication by and between each primary unit, each secondary unit, and/or an external device or system.

2. The system according to claim 1, wherein the primary unit and the one or more secondary units are configured as movable units.

3. The system according to claim 1, wherein the primary unit is configured as a movable unit, the one or more secondary units configured as portable units.

4. The system according to claim 1, wherein at least one power source in a secondary unit is a power circuit connectable to the power source in the primary unit by a power cable or by a wireless power interface, such that the primary unit power source provides power for the elements configured for performing at least one cleaning or grounds maintenance operation in the secondary unit.

5. The system according to claim 1, wherein the primary unit has a charging module, and at least one of the one or more secondary units has one or more batteries as the secondary unit power source, the charging unit being connectable thereto for charging thereof.

6. The system according to claim 5, wherein the primary unit power source is connectable to at least one of the one or more secondary units via a first coupling part provided with the primary unit and a second coupling part engageable therewith which is located on the secondary unit.

7. The system according to claim 6, wherein the secondary unit has two coupling parts located at opposite ends thereof.

8. The system according to claim 5, wherein the primary unit power source is connectable to at least one of the one or more secondary units via a connector selected from the group consisting of a power cable, a plug-socket arrangement, connectable power terminals, and connectable wireless power interfaces.

9. The system according to claim 5, wherein the primary unit further comprises a battery compartment having one or more slots for holding one or more batteries or battery packs therein, the battery compartment having connectors for connecting the batteries or battery packs with the charging module.

10. The system according to claim 9 wherein one or more of the secondary units further comprises a battery compartment having one or more slots for holding one or more batteries or battery packs therein, the battery compartment having connectors for connecting the one or more batteries or battery packs to the secondary unit power source.

11. The system according to claim 1, wherein the elements configured for performing at least one cleaning or grounds maintenance operation in the primary unit include at least one storage means for holding collected particles, debris or fluids.

12. The system according to claim 11 wherein elements configured for performing at least one cleaning or grounds maintenance operation in the secondary unit include at least one storage means for holding collected particles, debris or fluids, and further comprising a coupling arrangement for coupling the storage means in the secondary unit with the storage means in the primary unit, when the secondary unit is stored in the receiving means of the primary unit.

13. The system according to claim 1 further comprising one or more sensors associated with the primary unit selected from the group consisting of a contact sensor, a proximity sensor, a near-field sensor, one or more sensors for sensing a performance of the primary unit, the one or more sensors connected to the primary controller.

14. The system according to claim 1 further comprising one or more sensors associated with the secondary unit selected from the group consisting of a contact sensor, a proximity sensor, a near-field sensor, one or more sensors for sensing a performance of the secondary unit, the one or more sensors connected to the secondary controller.

15. The system according to claim 1, wherein the primary unit controller is configured to use the communication means to communicate with at least one secondary unit for guiding the secondary unit into the primary unit receiving means.

16. The system according to claim 6 wherein the primary unit controller is configured to use the communication means to communicate with at least one secondary unit for guiding the second coupling part into engaging with the first coupling part.

* * * * *